United States Patent [19]

Bar-Joseph et al.

[11] Patent Number: 4,822,992

[45] Date of Patent: Apr. 18, 1989

[54] WAVELENGTH CONVERSION USING SELF ELECTROOPTIC EFFECT DEVICES

[75] Inventors: Israel Bar-Joseph, Highlands; Daniel S. Chemla, Rumson; David A. B. Miller, Fair Haven, all of N.J.

[73] Assignees: American Telephone and Telegraph Company, New York, N.Y.; AT&T Bell Laboratories, Murray Hill, N.J.

[21] Appl. No.: 140,079

[22] Filed: Dec. 31, 1987

[51] Int. Cl.⁴ .............................................. H01J 40/14
[52] U.S. Cl. .................................. 250/211 J; 357/4; 357/16; 357/30
[58] Field of Search ............... 250/211 R; 357/16, 30, 357/4

[56] References Cited

U.S. PATENT DOCUMENTS

| | | | |
|---|---|---|---|
| 4,450,463 | 5/1984 | Chin | 357/4 |
| 4,525,687 | 6/1985 | Chemla et al. | 332/7.51 |
| 4,546,244 | 10/1985 | Miller | 250/211 J |

OTHER PUBLICATIONS

H. C. Lee et al., "Electroabsorption in AlGaAs/GaAs Multiple Guantum Well Structures Grown on a GaP Transparent Substrate", Appl. Phys. Lett. 51, 16 Nov. 1987, pp. 1582–1584.

K. Kaede et al., "High-Speed GaAs/AlGaAs Photoconductive Detector Using a P-Modulation Doped Multiguantum Well Structure", Appl. Phys. Lett. 48, 21 Apr. 1986, p. 1097.

*Electronics Letters*, vol. 23, No. 20, (1987), "Tunable Optical Wavelength Conversion Using a Multielectrode Distributed-Feedback Laser Diode With a Saturable Absorber", by H. Kawaguchi et al., pp. 1088–1090.

*IEEE Transactions on Electron Devices*, vol. ED-28, No. 4, Apr. 1981, "Monolithic GaAlAs/GaAs Infrared-to-Visible Wavelength Converter with Optical Power Amplification", by H. Beneking et al., pp. 404–407.

*Appl. Phys. Lett.*, vol. 49 (13), 29, Sep. 1986, "Integrated Quantum Wells Self-Electrooptic Effect Device: 2×2 Array of Optically Bistable Switches", by D. A. B. Miller et al., pp. 821–823.

*Appl. Phys. Lett.*, vol. 50 (15), 13 Apr. 1987, "Quantum--Confined Stark Effect in InGaAs/InP Quantum Wells Grown by Organometallic Vapor Phase Epitaxy", by I. Bar-Joseph et al., pp. 1010–1012.

*Conference on Laser and Electrooptics*, Paper ThT12 (1987), "The Symmetric Self Electro-Optic Effect Device", by A. Lentine et al., pp. 249–250.

*Primary Examiner*—David C. Nelms
*Assistant Examiner*—Eric Chatmon
*Attorney, Agent, or Firm*—Gregory C. Ranieri

[57] ABSTRACT

Information borne by an optical signal at a first wavelength is transferred intact to another optical signal at a second wavelength and vice versa via an optoelectronic circuit employing quantum well devices connected serially to facilitate self electrooptic effects therein. The optoelectronic circuit accepts two input signals and provides two output signals wherein an input signal and its corresponding output signal are at the same wavelength. Bidirectional information transfer with bidirectional wavelength conversion is permitted by the optoelectronic circuit.

22 Claims, 2 Drawing Sheets

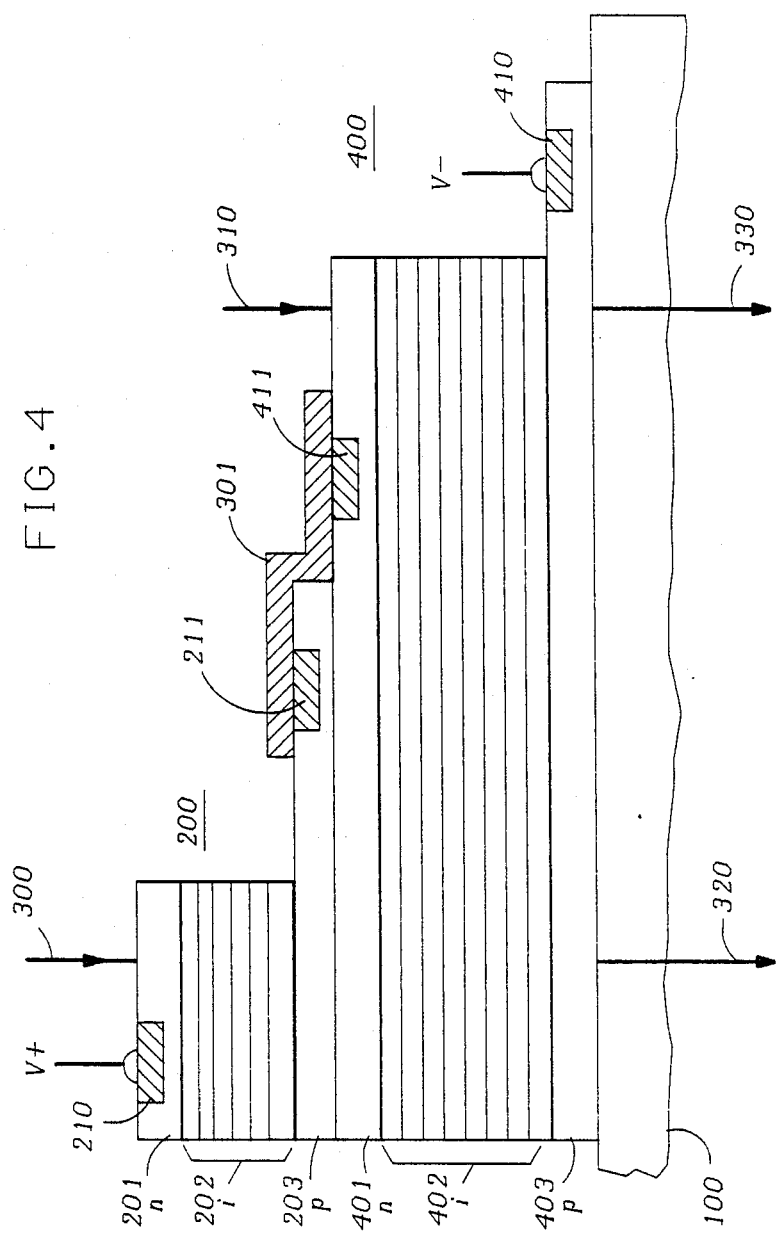

WAVELENGTH CONVERSION USING SELF ELECTROOPTIC EFFECT DEVICES

TECHNICAL FIELD

This invention relates to the field of optical devices and, more particularly, to devices comprising semiconductor quantum wells utilizing the self electrooptic effect.

BACKGROUND OF THE INVENTION

Quantum well devices have been developed recently to provide classical optical communication system functions such as modulation, detection, and optical signal generation. See, for example, U.S. Pat. No. 4,525,687. By employing the nonlinear bistability of certain devices, it has been possible to extend the growth of quantum well devices into the areas of switching systems and optical computing. In the latter areas, quantum well devices have been fabricated as basic Boolean logic devices such as AND and OR gates, complex memory and processing devices such as S-R flip-flops and logic device arrays for parallel processing, and switching devices such as n x n switching arrays.

Improvements to the latter quantum well devices have centered on the development of the self electrooptic effect device, more commonly referenced as the SEED device. See U.S. Pat. No. 4,546,244. In the operation of the SEED device, a photocurent generated from the absorption of optical energy by a diode may change the voltage across the diode which, in turn, causes a change in the absorption characteristic of the diode. The diode is generally a GaAs/AlGaAs p-i-n structure wherein the intrinsic region (i) comprises one or more quantum well layers. Connection of the diode to a proper electrical load such as a resistive load and tuning the optical signal wavelength coincidently with the heavy hole exciton resonance wavelength permits switching and bistable behavior (hysteretic operation) to be achieved via a positive feedback mechanism.

An integrated structure for the SEED device has been proposed in which a p-i-n diode having quantum wells in the intrinsic region is vertically integrated in series with a standard photodiode that is used as a "resistive" load. See D. A. B. Miller et al., *Appl. Phys. Lett.*, Vol. 49, No. 13, pp. 821-3 (1986). The two diodes are responsive to different wavelengths such that the load photodiode is transparent to the infrared wavelengths used in the quantum wells of the other diode and is opaque to wavelengths shorter than infrared. When operated, a control light beam shone on the load photodiode effectively varies the resistance of the load in the circuit thereby affecting the switching characteristics (speed and power) of the integrated SEED device. In addition to the control light beam, an input infrared light beam is directed on the SEED device and a single infrared light beam is output from the device.

In another related development, a symmetric SEED device has been proposed in which two serially connected p-i-n photodiodes are fabricated with substantially identical quantum well layers in the respective intrinsic regions. See A.Lentine et al., *Conference on Lasers and Electrooptics*, Paper ThT12 (1987). This structure is called symmetric because each photodiode operates as the load for the other. It has been proposed that this structure act as a bistable optical memory element such as an optical S-R flip-flop. As an S-R flip-flop, the structure supports dual inputs and dual outputs wherein the optical wavelengths for all inputs and outputs are identical.

It should be clear to those skilled in the art that none of the devices described above are capable of receiving dual input optical signals at different wavelengths and, in response to the dual input signals, generating dual output signals at the corresponding different wavelengths wherein at least one output signal is functionally related to the input signal of the different wavelength. For example, it is not possible for information borne by an optical signal at a first wavelength to be transferred intact to another optical signal at a second wavelength and vice versa via any optoelectronic circuit employing quantum well devices as described above. In other words, the devices described above are not capable of bidirectional information transfer with bidirectional wavelength conversion.

SUMMARY OF THE INVENTION

These and other limitations of the prior art devices are overcome in accordance with the principles of the invention by an optoelectronic circuit employing quantum well devices connected serially to facilitate self electrooptic effects therein. The optoelectronic circuit accepts two input signals and provides two output signals wherein are input signal and its corresponding output signal are at the same wavelength. Information borne by an optical signal at a first wavelength is transferable intact to another optical signal at a second wavelength and vice versa. That is, the optoelectronic circuit performs bidirectional information transfer with bidirectional wavelength conversion.

The optoelectronic circuit comprises first and second elements having their own quantum well regions connected together electrically in series for electrically controlling an optical absorption or an index of refraction in the adjacent quantum well region. Each quantum well region is comprised of semiconductor material having a predetermined optical response characteristic at a corresponding different wavelength.

BRIEF DESCRIPTION OF THE DRAWING

A more complete understanding of the invention may be obtained by reading the following description of a specific illustrative embodiment of the invention in conjunction with the appended drawing in which:

FIG. 4 is a cross-sectional view of an integrated circuit embodying the principles of this invention.

DETAILED DESCRIPTION

Figure 1:
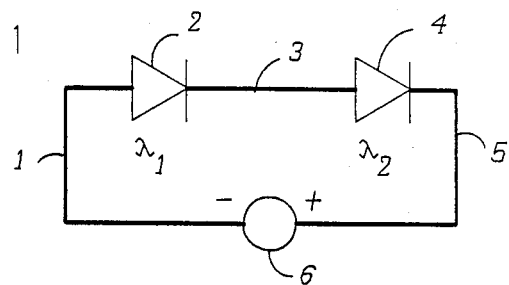
FIG. 1 is a schematic diagram of an optoelectronic circuit in accordance with the principles of the invention.

FIG. 1 shows a schematic diagram of two reverse-biased multiple quantum well diodes arranged electrically in series in accordance with the principles of this invention. Diode 2 includes a quantum well region responsive to optical signals substantially at wavelength $\lambda_1$. Diode 4 includes a quantum well region responsive to optical signals substantially at wavelength $\lambda_2$. Diodes 2 and 4 are connected in series aiding configuration via electrical lead 3. Reverse bias voltage is applied to the diodes by source 6 connected to diode 2 via electrical lead 1 and connected to diode 4 via electrical lead 5.

In an example from experimental practice, the optoelectronic circuit shown in FIG. 1 was realized as a hybrid circuit using discrete components. Diode 2 was fabricated as an InGaAs multiple quantum well p-i-n didoe wherein the quantum well region was located in the intrinsic region of the diode. Fabrication of diode 2 is explained for those skilled in the art in I. Bar-Joseph et al., *Appl. Phys. Lett.*, Vol. 50, No. 15, pp. 1010–2 (1987). This diode was illuminated by a tunable NaCl color center laser at the heavy hole exciton resonance wavelength ($\lambda_1 = 1610$ nm) for the InGaAs quantum wells. Diode 4 was fabricated as a GaAs multiple quantum well p-i-n diode wherein the quantum well region was located in the intrinsic region of the diode. Fabrication of diode 4 is explained for those skilled in the art in U.S. Pat. No. 4,525,687. This diode was illuminated by a tunable dye laser (LDS 821) at the heavy hole exciton resonance wavelength ($\lambda_2 = 850$ nm) for the GaAs quantum wells. By ramping the intensity of the color center laser up and down while maintaining a constant intensity for the dye laser, it was observed that the output intensity from diode 4 varied as a function of the input intensity to diode 2. In other words, the information carried by the modulated color center laser beam at wavelength $\lambda_1$ was transferred intact to the beam at wavelength $\lambda_2$ output from diode 4. The results of this experiment are plotted in FIG. 3.

In a related experiment, by ramping the intensity of the dye laser up and down while maintaining a constant intensity for the color center laser, it was observed that the output intensity from diode 2 varied as a function of the input intensity to diode 4. In other words, the information carried by the modulated dye laser beam at wavelength $\lambda_2$ was transferred intact to the beam at wavelength $\lambda_1$ output from diode 2. The result of this experiment when taken with the result above indicates clearly that the single optoelectronic circuit in FIGS. 1 and 2 is capable of bidirectional information transfer with bidirectional wavelength conversion.

Figure 2:
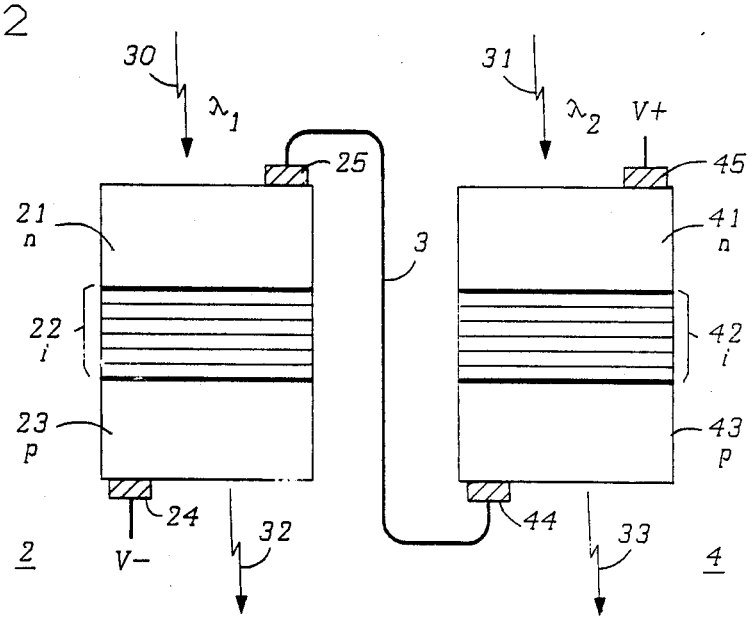
FIG. 2 is a simplified cross-sectional diagram of the semiconductor layers employed by the circuit shown in FIG. 1.

FIG. 2 shows a simplified cross-sectional layer diagram for the exemplary devices included in the optoelectronic circuit of FIG. 1. It will be understood by those skilled in the art that the layers shown in the FIG. are not drawn to scale and only depict the important active layers while others such as the substrate have been omitted. As shown in FIG. 2, diode 2 comprises a p-i-n quantum well photodiode structure in which layer 21 is n-doped InP (1.0 μm thickness), intrinsic region 22 includes a plurality of alternating layers ($\approx 100$ pairs) of InGaAs wells (100 angstroms thickness) and InP barriers (100 angstroms thickness) to form the quantum well region, and layer 23 in p-doped InP (1.0 μm thickness). Electrical contact is made to layer 21 via metallic contact 25 and to layer 23 via metallic contact 24. In a similar fashion, diode 4 comprises a p-i-n quantum well photodiode structure in which layer 41 is n-doped AlGaAs (1.0 μm thickness), intrinsic region 42 includes a plurality of alternating layers ($\approx 100$ pairs) of GaAs wells (100 angstroms thickness) and AlGaAs barriers (100 angstroms thickness) to form the quantum well region, and layer 43 in p-doped AlGaAs (1.0 μm thickness). Electrical contact is made to layer 41 via metallic contact 45 and to layer 43 via metallic contact 45. Biasing potential of 20 volts is supplied to contact 24 (V−) and contact 44 (V+) to achieve a reverse bias condition. The diodes are interconnected in series-aiding configuration via lead 3 connecting contacts 25 and 44.

During operation, light beams 30 and 31 are directed on diodes 2 and 4, respectively. Light beam 30 has a wavelength $\lambda_1 = 1610$ nm which approximates the heavy hole exciton resonance for InGaAs/InP quantum wells. Likewise, light beam 31 has a wavelength $\lambda_2 = 850$ nm which approximates the heavy hole exciton resonance for GaAs/AlGaAs quantum wells. When light beam 30 is modulated and light beam 31 is maintained at a constant intensity, light beam 33 emerges from diode 4 bearing the modulation information from light beam 30 but at the wavelength $\lambda_2$. Alternatively, when light beam 31 is modulated and light beam 30 is maintained at a constant intensity, light beam 32 emerges from diode 2 bearing the modulation information from light beam 31 but at the wavelength $\lambda_1$.

While the combination of GaAs/AlGaAs and InGaAs/InP quantum well devices has been described above, it is to be understood by those skilled in the art that other combinations of quantum well types are possible. For example, it is expected that combinations of quantum wells from the Group III-V system of semiconductor compounds such as InGaAsP/InP, GaAs/AlGaAs, GaSb/GaAlSb and InGaAs/InP and the like may be substituted for the quantum well regions shown in FIG. 2 to achieve modulation conversion at other wavelengths. Actual heavy hole exciton resonance wavelength varies according to the particular mole fraction ($0 \leq x \leq 1$ and $0 \leq y \leq 1$) used during device fabrication and the range of wavelengths existing for each compound is approximately as follows:

$In_xGa_{1-x}As_yP_{1-y}/InP$: 1.1–1.6 μm
$GaAs/Al_xGa_{1-x}As$: 0.82–0.86 μm
$GaSb/Ga_xAl_{1-x}Sb$: 1.4–1.6 μm
$In_{0.47}Ga_{0.53}As/In_{0.48}Al_{0.52}As$: 1.3–1.6 μm,

Devices incorporating these and other compounds may be discrete, hybrid or integrated. Fabrication techniques of the basic p-i-n quantum well structure for Group III-V compounds is well known from the technical literature and is not repeated herein.

Figure 3:
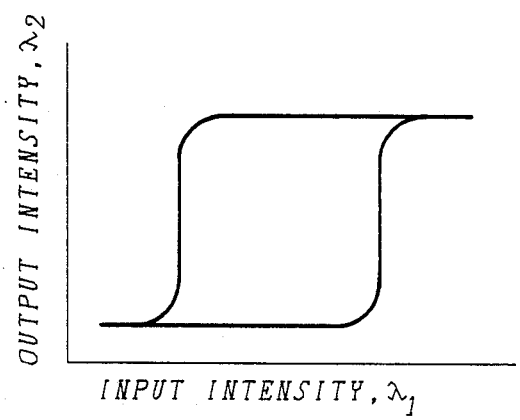
FIG. 3 is a graphical plot of optical intensities to illustrate the hysteresis of the circuit in FIG. 1.

FIG. 3 shows an actual graphical plot of the output intensity for the optical signal from diode 4 at wavelength $\lambda_2$ as a function of the input intensity of the optical signal from diode 2 at wavelength $\lambda_1$. The experimental configuration and procedures which produced these results have been described above in reference to FIG. 1.

FIG. 4 shows a cross-sectional view of an integrated semiconductor circuit embodying the principles of the present invention. By employing standard epitaxial growth techniques for creating the semiconductor heterostructure, standard photolithography, masking and etching techniques for defining the various mesas, and standard alloying techniques to form the contacts, it is possible to form the integrated circuit shown in FIG. 4.

As shown in FIG. 4, the integrated circuit comprises two series-aiding multiple quantum well photodiodes grown on InP substrate 100. Substrate 100 is transparent to the operating wavelengths of interest thereby permitting optical access to the active regions of the device. Diodes 200 and 400 comprise epitaxial p-type, intrinsic and n-type layers. Doping concentrations are generally in the range $10^{17}$ to $10^{18} cm^{-1}$.

For diode 200, n-doped layer 201 is approximately 1 μm thick InGaAsP; intrinsic region 202 comprises approximately 100 pairs of thin (100 angstroms) InGaAs well layers and InGaAsP barrier layers; and p-doped layer 203 is approximately 1 μm thick InGaAsP. Both the InGaAsP (λ≈1.3 λm) and the InGaAs (λ≈1.5 μm) are selected to be lattice matched to InP. Alloyed contact 210 is formed in n-doped layer 201 for connection to the power supply. Alloyed contact 211 is formed in p-doped layer 203 for interconnection from diode 200 to diode 400 via gold interconnection pad 301. Diode 200 is responsive to input light beam 300 at a wavelength of 1.5 μm. Light beam 320 at 1.5 μm is the output beam for diode 200.

For diode 400, n-doped layer 401 is approximately 1 μm thick InP; intrinsic region 402 comprises approximately 100 pairs of thin (100 angstroms) InGaAsP well layers and InP barrier layers; and p-doped layer 403 is approximately 1 μm thick InP. InGaAsP (λ≈1.3 μm) is selected to be lattice matched to InP. Alloyed contact 410 is formed in p-doped layer 403 for connection to the power supply. Alloyed contact 411 is formed in n-doped layer 401 for interconnection from diode 400 to diode 200 via gold interconnection pad 301. Diode 400 is responsive to input light beam 310 at a wavelength of 1.3 μm. Light beam 330 at 1.3 μm is the output beam for diode 400.

It is understood that the above-described embodiments are merely illustrative of the principles of this invention. Various other modifications may be made by those skilled in the art which will embody the principles of the invention and fall within the spirit and scope thereof. For example, the optoelectronic circuit may be utilized in a waveguide mode with a possible reduction of the number of layers in the intrinsic region and a possible elimination of the biasing source. It is also understood that in such a waveguide structure proper fabrication of the layer thicknesses may result in an antiresonant reflector optical waveguide with vertical coupling between the photodiodes.

What is claimed is:

1. An optical device comprising first means including a quantum well region and second means including a quantum well region, said first means connected electrically in series with said second means for electrically controlling an optical absorption in the quantum well region of said second means, said second means for changing said optical absorption in response to said electrically controlling by said first means, wherein the improvement comprises said quantum well region of said first means including semiconductor material having a predetermined optical response characteristic at a first wavelength, said quantum well region of said second means including semiconductor material having said predetermined optical response characteristic at a second wavelength, and said first and second wavelengths are different from each other.

2. The optical device defined in claim 1 wherein said first means includes a p-i-n diode and said second means includes a p-i-n diode.

3. The optical device defined in claim 2 wherein the semiconductor material is chosen from Group III-V.

4. The optical device defined in claim 3 wherein the semiconductor material of said quantum well region in said first means consists of compounds selected from an AlGaAs/GaAs system and the semiconductor material of said quantum well region in said second means consists of compounds selected from an InGaAs/InP system.

5. The optical device defined in claim 3 wherein the semiconductor material of said quantum well region in said first means consists of compounds selected from an InGaAs/InGaAsP system and the semiconductor material of said quantum well region in said second means consists of compounds selected from an InGaAsP/InP system.

6. The optical device defined in claim 1 wherein the optical device further includes said second means for electrically controlling an optical absorption in the quantum well region of said first means.

7. The optical device defined in claim 6 wherein said first means includes a p-i-n diode and said second means includes a p-i-n diode.

8. The optical device defined in claim 7 wherein the semiconductor material is chosen from Group III-V.

9. The optical device defined in claim 8 wherein the semiconductor material of said quantum well region in said first means consists of compounds selected from an AlGaAs/GaAs system and the semiconductor material of said quantum well region in said second means consists of compounds selected from an InGaAs/InP system.

10. The optical device defined in claim 8 wherein the semiconductor material of said quantum well region in said first means consists of compounds selected from an InGaAs/InGaAsP system and the semiconductor material of said quantum well region in said second means consists of compounds selected from an InGaAsP/InP system.

11. The optical device defined in claim 1 wherein the optical device further includes said second means for electrically controlling an index of refraction in the quantum well region of said first means.

12. An optical device comprising first means including a quantum well region and second means including a quantum well region, said first means connected electrically in series with said second means for electrically controlling an index of refraction in the quantum well region of said second means, said second means for changing said index of refraction in response to said electrically controlling by said first means, wherein the improvement comprises said quantum well region of said first means including semiconductor material having a predetermined optical response characteristic at a first wavelength, said quantum well region of said second means including semiconductor material having said predetermined optical response characteristic at a second wavelength, and said first and second wavelengths are different from each other.

13. The optical device defined in claim 12 wherein said first means includes a p-i-n diode and said second means includes a p-i-n diode.

14. The optical device defined in claim 13 wherein the semiconductor material is chosen from Group III-V.

15. The optical device defined in claim 14 wherein the semiconductor material of said quantum well region in said first means consists of compounds selected from an AlGaAs/GaAs system and the semiconductor material of said quantum well region in said second means consists of compounds selected from an InGaAs/InP system.

16. The optical device defined in claim 14 wherein the semiconductor material of said quantum well region in said first means consists of compounds selected from an InGaAs/InGaAsP system and the semiconductor material of said quantum well region in said second means consists of compounds selected from an InGaAsP/InP system.

17. The optical device defined in claim 12 wherein the optical device further includes said second means for electrically controlling an optical absorption in the quantum well region of said first means.

18. The optical device defined in claim 12 wherein the optical device further includes said second means for electrically controlling an index of refraction in the quantum well region of said first means.

19. The optical device defined in claim 17 wherein said first means includes a p-i-n diode and said second means includes a p-i-n diode.

20. The optical device defined in claim 19 wherein the semiconductor material is chosen from the Group III-V.

21. The optical device defined in claim 20 wherein the semiconductor material of said quantum well region in said first means consists of compounds selected from an AlGaAs/GaAs system and the semiconductor material of said quantum well region in said second means consists of compounds selected from an InGaAs/InP system.

22. The optical device defined in claim 20 wherein the semiconductor material of said quantum well region in said first means consists of compounds selected from an InGaAs/InGaAsP system and the semiconductor material of said quantum well region in said second means consists of compounds selected from an InGaAsP/InP system.

* * * * *